(12) United States Patent
Zitnik

(10) Patent No.: US 11,576,402 B2
(45) Date of Patent: Feb. 14, 2023

(54) SYSTEMS AND METHODS FOR PRODUCING PET FOOD

(71) Applicant: James K. Zitnik, Southlake, TX (US)

(72) Inventor: James K. Zitnik, Southlake, TX (US)

( * ) Notice: Subject to any disclaimer, the term of this patent is extended or adjusted under 35 U.S.C. 154(b) by 767 days.

(21) Appl. No.: 15/860,124

(22) Filed: Jan. 2, 2018

(65) Prior Publication Data

US 2018/0116247 A1 May 3, 2018

Related U.S. Application Data

(63) Continuation-in-part of application No. 14/180,008, filed on Feb. 13, 2014, now Pat. No. 9,872,509.

(60) Provisional application No. 61/866,775, filed on Aug. 16, 2013.

(51) Int. Cl.
*A22C 17/00* (2006.01)
*A23K 10/20* (2016.01)
*A23K 40/10* (2016.01)

(52) U.S. Cl.
CPC .......... *A23K 10/20* (2016.05); *A22C 17/0026* (2013.01); *A23K 40/10* (2016.05)

(58) Field of Classification Search
CPC .... A22C 17/0026; A23K 40/10; A23K 10/20; C11B 1/10; C11B 13/00; C11B 1/06; C11B 1/16; C11B 1/00; C11B 1/12; C11B 3/006; C11B 3/16; C11B 3/001
See application file for complete search history.

(56) References Cited

U.S. PATENT DOCUMENTS

| | | | |
|---|---|---|---|
| 3,230,054 A | 1/1966 | Ling | |
| 3,398,676 A | 8/1968 | Theobald et al. | |
| 3,410,882 A | 11/1968 | Macy et al. | |
| 3,673,227 A | 7/1972 | Keith | |
| 3,730,344 A | 3/1973 | Mason | |
| 3,780,075 A | 12/1973 | Dufault et al. | |
| 3,857,989 A | 12/1974 | King | |
| 3,899,301 A | 8/1975 | Bredeson et al. | |
| 4,157,335 A | 6/1979 | Dobbs | |
| 4,166,836 A | 9/1979 | Pikel | |
| 4,259,361 A | 3/1981 | Procter | |
| 4,289,067 A | 9/1981 | Hanak | |
| 4,361,590 A | 11/1982 | Wojcik | |
| 4,844,817 A | 7/1989 | Flanigan et al. | |
| 5,584,236 A * | 12/1996 | Margolis | A23L 13/426 210/248 |
| 5,688,549 A | 11/1997 | Roehrig et al. | |
| 5,725,897 A | 3/1998 | Schaefer et al. | |
| 5,762,993 A | 6/1998 | Gundlach et al. | |
| 5,786,015 A | 7/1998 | Warren et al. | |
| 5,965,184 A | 10/1999 | Schaefer et al. | |
| 5,972,403 A | 10/1999 | Tiller | |
| 6,159,515 A | 12/2000 | Schaefer et al. | |
| 6,589,422 B2 | 7/2003 | Low | |
| 6,685,975 B2 | 2/2004 | Saxby | |
| 6,732,454 B2 | 5/2004 | Anderson et al. | |
| 6,949,265 B1 | 9/2005 | Schaefer et al. | |
| 7,364,765 B2 | 4/2008 | Baensch | |
| 7,456,305 B2 | 11/2008 | Piacentini et al. | |
| 7,507,869 B2 | 3/2009 | Cisneros | |
| 7,661,355 B2 | 2/2010 | Kremer | |
| 7,666,456 B2 | 2/2010 | Garwood | |
| 7,687,648 B2 | 3/2010 | Smallridge et al. | |
| 7,823,811 B2 | 11/2010 | Mosley et al. | |
| 7,887,398 B2 | 2/2011 | Packer et al. | |
| 7,897,050 B2 | 3/2011 | Waibel et al. | |
| 7,984,865 B2 | 7/2011 | Mosley et al. | |
| 8,080,270 B1 | 12/2011 | Schaefer et al. | |
| 8,163,945 B2 | 4/2012 | Thornhill et al. | |
| 2004/0182260 A1 | 9/2004 | Miles | |
| 2004/0186307 A1 | 9/2004 | Piacentini et al. | |
| 2005/0106715 A1 | 5/2005 | Niv et al. | |
| 2009/0061067 A1 | 3/2009 | Tilseth et al. | |
| 2010/0160658 A1 | 6/2010 | Kemper et al. | |
| 2010/0196981 A1 | 8/2010 | Aharon et al. | |
| 2010/0233349 A1 | 9/2010 | Smallridge et al. | |
| 2010/0234569 A1 | 9/2010 | Helling et al. | |
| 2012/0128838 A1 | 5/2012 | Virippil et al. | |
| 2012/0141645 A1 | 6/2012 | Tomcak et al. | |
| 2012/0171352 A1 | 7/2012 | Kelleher et al. | |
| 2012/0231148 A1 | 9/2012 | Garwood | |
| 2012/0263838 A1 | 10/2012 | Johnston | |
| 2013/0115349 A1 | 5/2013 | Garwood | |
| 2013/0236619 A1 * | 9/2013 | Savage | A23L 3/3508 426/532 |

FOREIGN PATENT DOCUMENTS

FR 2296374 A1 * 7/1976 ............... C11B 1/00

OTHER PUBLICATIONS

European Search Report for EP Application 14175098.4, dated Feb. 11, 2015, 9 pages, European Patent Office.

* cited by examiner

*Primary Examiner* — Vera Stulii
(74) *Attorney, Agent, or Firm* — Kirby Drake

(57) ABSTRACT

Methods for producing pet food from animals may utilize a multi-step process including a first processing system that may include at least a heating step through use of a steam jacketed tube system and a draining step to squeeze out the oils. Grinding and pre-breaking may first be used to break the fat/whole animal into pieces. The protein may be cooked in the first processing system, and a second processing system may cook the protein with hot water in the second heating step. The second processing system may wash impurities out of the protein and subject the protein to a high intensity flame that may burn off foreign matter, and/or microbes. The protein may be dried and may produce pet food for consumption by pets.

15 Claims, 2 Drawing Sheets

SYSTEMS AND METHODS FOR PRODUCING PET FOOD

CROSS-REFERENCE TO RELATED APPLICATIONS

This Application is a continuation-in-part of U.S. application Ser. No. 14/180,008 filed Feb. 13, 2014, entitled "Systems and Methods for Improved Rendering," and U.S. Provisional Application No. 61/866,775 filed Aug. 16, 2013, entitled "Systems and Methods for Improved Rendering," both of which are incorporated herein by reference in their entirety.

FIELD OF THE DISCLOSURE

The present disclosure generally relates to processing whole animals and animal products, and more particularly to systems and methods for forming products for the pet food industry.

BACKGROUND

Rendering is a process that generally converts animal products into more useful materials. Rendering typically separates the fat from the bone and protein and yields a fat commodity (such as grease) and a protein meal (meat or bone meal). Batch cooking systems and continuous cooker systems have been used for rendering. While these systems may be helpful in rendering, there are deficiencies that can lead to less than desirable end products and also can be energy intensive and are expensive to operate.

SUMMARY

Embodiments of the present disclosure may provide systems and methods for producing pet food from whole animals and animal products. A first processing system may provide ground materials, and a second processing system may wash out impurities from protein and flame-dry the protein to produce pet food. Additional steps may be employed without departing from the present disclosure.

Embodiments of the present disclosure may provide a method for producing pet food. The method may include grinding and pre-breaking animal products and a whole animal in a grinder and a pre-breaker machine. The pre-breaker machine may be configured to break up the animal products and the whole animal, and the grinder may be configured to form ground materials. The method may include transporting and heating the ground materials in a first heating step to create a slurry as the ground materials liquefy to form liquefied ground materials. The method may further provide draining protein from the liquefied ground materials. The protein may be washed to remove impurities and flame-dried to burn off additional impurities and form safe pet food for consumption by pets. The method may provide cooking the protein in a second heating step to eliminate impurities and fat in the protein. The method may include cooking the protein in the second heating step with hot water which may eliminate impurities and fat in the protein.

The method may further include processing the protein through a centrifuge and spinning off the hot water that may eliminate impurities and oil residuals and may reduce humidity. The method may include transferring the oil and water to the centrifuge and removing residual solids from the oil and water to form a solution. The method may provide flame-drying the protein to expose the protein to a high intensity flame for a short period of time to burn off foreign matter and microbes in the protein. A pressure of approximately 4-5 ATM may be applied to the ground materials in the first heating step. The method may further provide the step of supplying pressure to the slurry between the first heating step and the draining step. The method may include pressing the slurry and may utilize a progressive cavity pump without further mechanical action. The method may further include cooking the protein with hot water that may eliminate impurities and fat in the protein. The material removed by the centrifuge may range in size from approximately 10 microns to approximately 1 millimeter. The method may include centrifuging the solution to remove water and fine materials from the oil. The method may further include employing a vertical separator that may remove waste water and sludge from the oil. The method may provide the steps of employing a waste water oil separator to further separate oil from waste water and employing a sludge oil separator to further separate oil from the sludge. Oil that may be separated through use of the waste water oil separator and the sludge oil separator may be returned to the centrifuge. Oil may be separated through use of the waste water oil separator and the sludge oil separator may be transferred to a storage tank. The method may provide the step of applying pressure to the protein that has been separated from the oil and water via a drainer, thereby forming additional protein and removing the residual liquid from the additional protein. The method may include transferring the removed residual liquid to a centrifuge, transferring the additional protein to a protein dryer to form a dried protein, and milling the dried protein to form a powder protein.

Embodiments of the present disclosure may provide a method for producing pet food that may include processing animal products or a whole animal to form ground materials in a first processing system. The method may provide washing ground materials to remove impurities in a second processing system. The ground materials may be flame-dried to burn off additional impurities, and edible pet food may be formed.

Other embodiments of the present disclosure may provide a method for processing of animal products and a whole animal that may produce pet food. The method may provide grinding and pre-breaking animal products and a whole animal in a grinder and a pre-breaker machine. The method may include transporting and heating the ground materials in a first heating step in one or more steam jacketed tubes to create a slurry as the ground materials liquefy. The method may include draining protein from the liquefied ground materials and cooking the protein in the second heating step with hot water to eliminate impurities and fat in the protein. The method may further include washing the protein to remove impurities and flame-drying the protein to burn off additional impurities and form safe pet food for consumption by pets.

BRIEF DESCRIPTION OF THE DRAWINGS

For a more complete understanding of this disclosure, reference is now made to the following description, taken in conjunction with the accompanying drawings, in which.

DETAILED DESCRIPTION

Processing animal products according to embodiments of the present disclosure may be accomplished through a multi-step process including at least a heating or cooking step employing one or more steam jacketed tubes as well as a draining step. However, as will be described in more detail below, additional steps may be employed to subject the animal products to heat and pressure to achieve high quality oil and protein products through processing of whole animals and animal products according to embodiments of the present disclosure. Systems and methods according to embodiments of the present disclosure also may provide considerable energy savings in processing of whole animals and animal products, particularly as the capital expenditures (CAPEX) for such an improved processing system may be considerably lower when compared to existing batch or continuous rendering or processing systems due to cheaper installation and lower operating costs.

Figure 1:
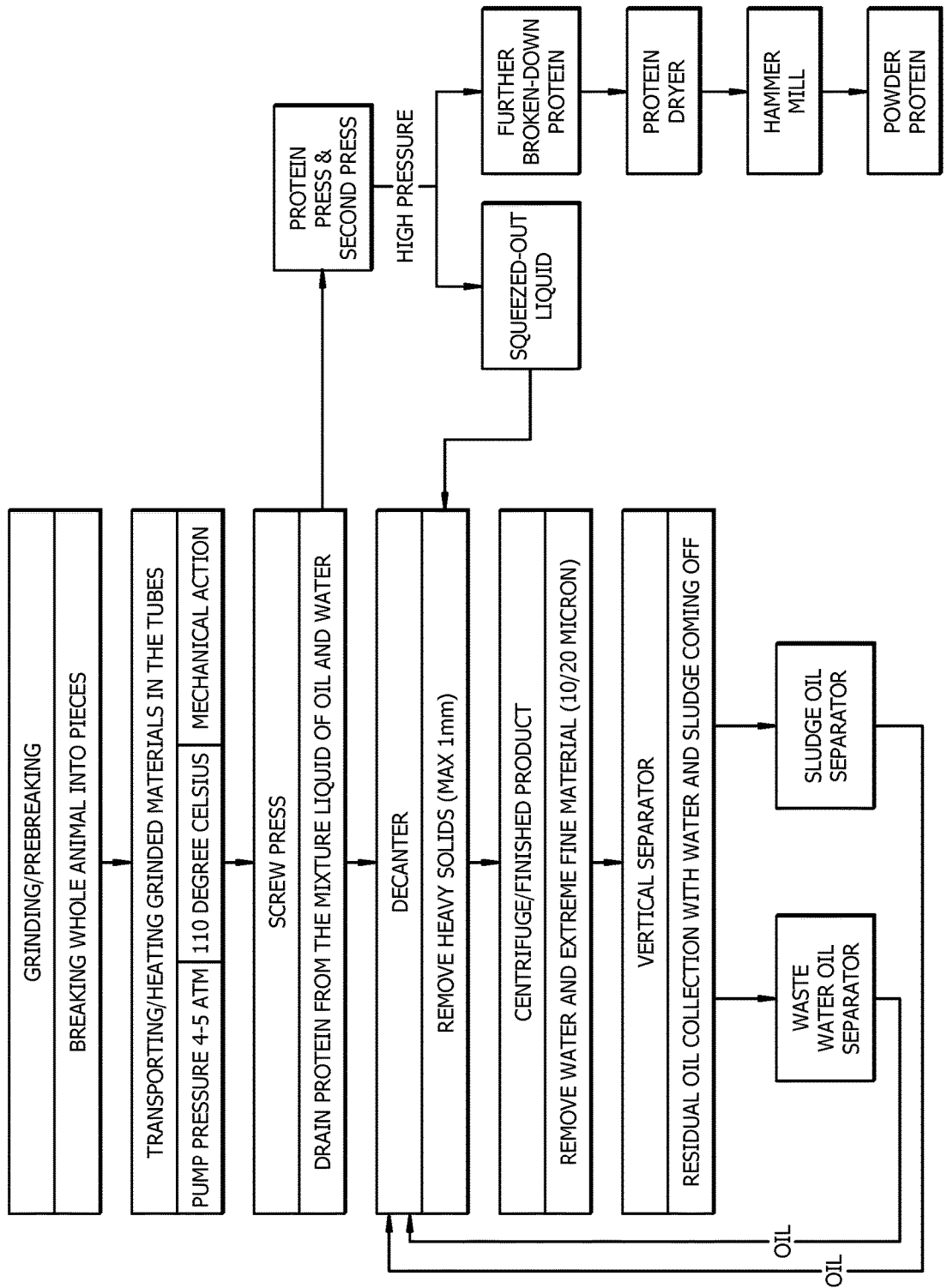
FIG. 1 depicts a system and method for improved processing of whole animals and animal products according to an embodiment of the present disclosure.

FIG. 1 depicts method for improved processing of whole animals and animal products 100 according to an embodiment of the present disclosure. In the grinding/pre-breaking step, fat, animal products, and/or whole animals may be broken into pieces. A pre-breaker machine may be used to break up the bones, and a grinder, such as a Weiler grinder, may be used for the grinding portion of this step. However, it should be appreciated that other similarly functioning machines may be used to perform this step without departing from the present disclosure. By finely grinding fat and whole animal in this early step of the process, additional surface area may be created. This allows a much lower use of energy to create the desired effect of separating the liquid from the protein in one or more steam jacketed tubes as described below.

Once the grinding/pre-breaking step is completed, the ground materials may be transported and heated or cooked in one or more steam-jacketed tubes. When heated, the ground materials may liquefy as they travel through the steam jacketed tubes to create a slurry. It should be appreciated that the pump pressure used in this step may be approximately 4-5 ATM, and the heating or cooking may be performed at a temperature of approximately 110 degrees Celsius according to an embodiment of the present disclosure. It should be appreciated that no further mechanical action should be required to perform this step of the improved rendering or processing method. However, further mechanical action may be employed without departing from the present disclosure.

A progressive cavity pump may be used to supply pressure to move the slurry through the steam jacketed tubes and up to the entry point of a screw press. The screw press may then be used to press out the oil and water from the slurry according to an embodiment of the present disclosure. This may drain protein from the liquid mixture of oil and water. It should be appreciated that use of a progressive cavity pump may create a large amount of pressure using a very small motor (i.e., a motor having approximately 1.25 hp). This pump may push material easily through the processing of whole animals and animal products system. It should be appreciated that the pump may push material the processing system without the need for additional mechanical action according to embodiments of the present disclosure.

Once the slurry is transferred into the drainer water and oil may be separated from the protein. The oil and water may be transferred to a centrifuge so that residual or heavy solids may be removed from the oil and water. It should be appreciated that a minimum of a 10-micron and a maximum of 1 millimeter sized material removed from the centrifuge should be used to perform this separation according to embodiments of the present disclosure. By using this decanting step, use of settling tanks may be eliminated and a higher quality oil product may be produced.

High pressure may be applied to the protein that has been separated from the oil and water through a drainer and/or a second drainer in order to further break down the protein and squeeze out any residual liquid or fat. Any residual liquid or fat that may be separated from the protein may be transferred to the centrifuge, and the decanting step may be employed with respect to this residual liquid or fat according to embodiments of the present disclosure.

Following the decanting step(s), a centrifuge, such as a vertical centrifuge, or other similar mechanism may be used to remove water and extremely fine material (generally below approximately 10-20 microns in size) from the oil. This centrifuge step may provide for a final separation of the oil and water.

A vertical separator or other similar mechanism may then be used for residual oil collection with water and sludge coming off. A waste water oil separator may then be used to further separate oil from the resultant waste water, wherein the separated oil may be returned to the centrifuge. Similarly, a sludge oil separator may then be used to further separate oil from sludge, wherein the separated oil may be returned to the centrifuge. It also should be appreciated that the oil that remains following the centrifuge step may then be stored in storage tanks according to embodiments of the present disclosure. The centrifuge step, like the decanting step, may eliminate the need to use settling tanks and may allow for a more high quality oil product to be produced.

The further broken-down protein that remains after the residual fat has been squeezed out may be then transferred to a protein dryer and then a hammer mill or another similar machine that may shred or crush the protein into smaller pieces, such as a protein powder, according to embodiments of the present disclosure.

Figure 2:
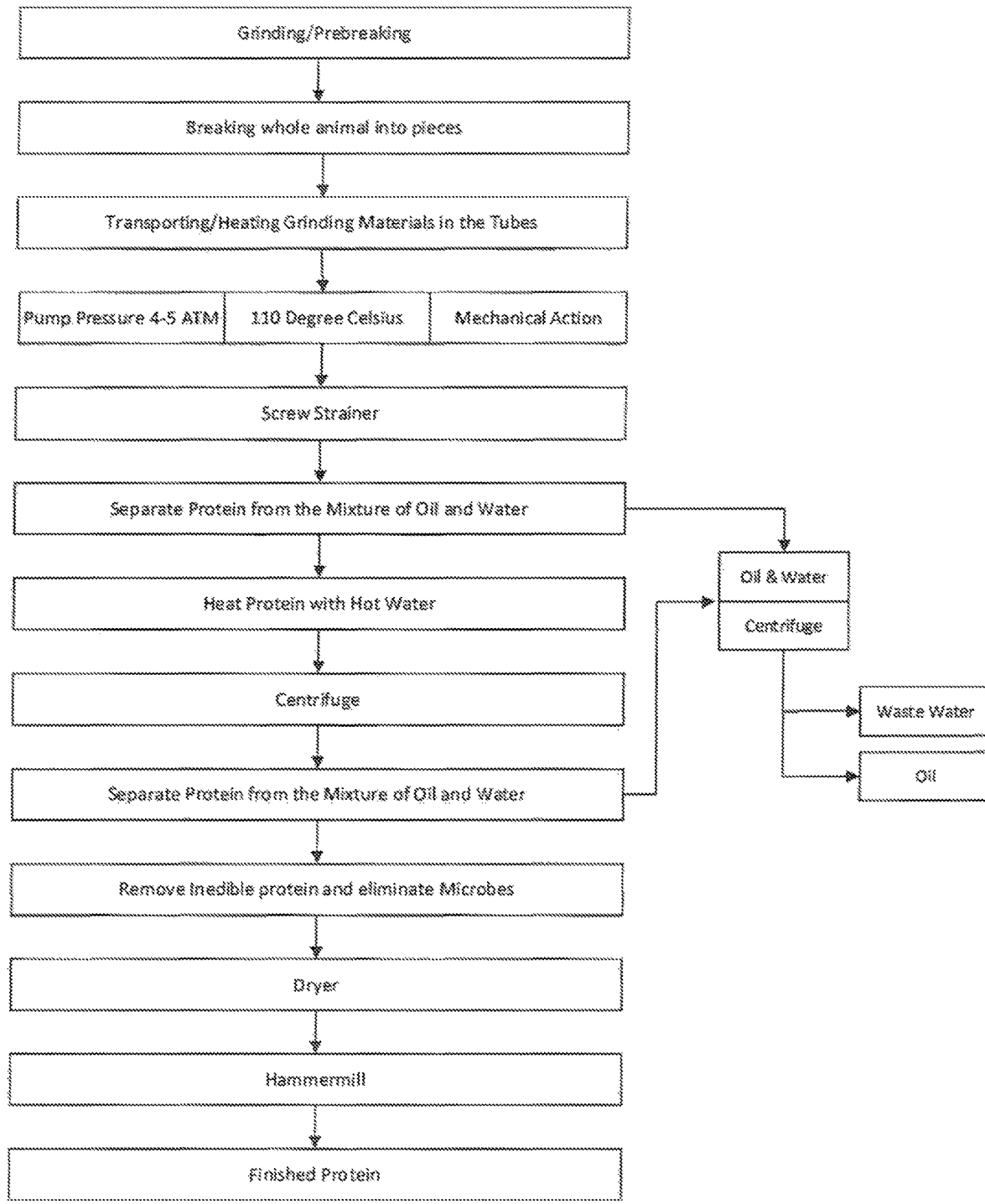
FIG. 2 depicts a system and method for processing of whole animals and animal products that may produce a pet food industry product according to an embodiment of the present disclosure.

FIG. 2 depicts method 200 for improved processing of whole animals and animal products that may produce pet food industry products according to an embodiment of the present disclosure. Method 200 may provide steps that may produce pet food products including, but not limited to, dog food and cat food. Similar to method 100 (FIG. 1), method 200 may produce pet food from fat, animal products, and/or whole animals by completing the steps provided in method 100 to form ground materials. Method 200 may further provide washing the materials to remove impurities, and flame-drying the materials to burn off additional impurities. Method 200 may grind/pre-break fat, animal products, and/or whole animals into pieces. Once the grinding/pre-breaking step is completed, the ground materials may be transported and heated or cooked in one or more steam-jacketed tubes that may create a slurry as the ground materials liquefy. It should be appreciated that the pump pressure used in this step may be approximately 4-5 ATM, and the heating or cooking may be performed at a temperature of approximately 110 degrees Celsius according to an embodiment of the present disclosure. Pressure may be supplied to the slurry utilizing a progressive cavity pump to move the slurry through one or more steam jacketed tubes. It should be appreciated that supplying pressure may not require further mechanical action to move the slurry in embodiments of the present disclosure. It should also be appreciated that the progressive cavity pump may push ground materials and may utilize a motor that may have approximately 1.25 horsepower. A drainer may be utilized and protein may be separated from the mixture of oil and water. Further, a residual liquid may be removed from the protein.

Method 200 may include steps in addition to the steps provided in method 100 (FIG. 1) that may drop materials into a similar or an identical system that may wash the materials to remove impurities and flame-dry the materials to burn off additional impurities. Method 200 may provide the advantage of requiring less rendering or processing to create a pet food product. As depicted in FIG. 2, method 200 may reintroduce protein and heat or cook the protein during a second heating or cooking action. It should be appreciated that the protein may be heated with hot water during the second cooking step. Reintroducing the protein may eliminate excess impurities and excess fat that may remain in the protein following the initial heating or cooking step. After the second heating or cooking step is completed, the materials may be centrifuged. It should be appreciated that a centrifuge may be utilized to centrifuge the materials in embodiments of the present disclosure. Protein may be separated from the mixture of oil and water, and the oil and water may be centrifuged to separate the oil from the water. Method 200 may also subject protein to a high intensity flame that may burn off additional impurities that may include, but are not limited to, hair, foreign matter, and/or microbes that may be found in the protein. Inedible protein and microbes may be eliminated to create a quality pet food product. It should be appreciated that flame drying the materials may be performed using a high temperature and for a short period of time. Final drying of the protein may be performed in a variety of ways including, but not limited to, utilizing traditional drying equipment. It should be appreciated moisture needed to provide edible and quality pet food may be included in the protein. A hammermill may be utilized to further crush or break down the protein, and a finished protein or refined pet food product may be produced.

It should be appreciated that systems and methods for improved processing of whole animals and animal products may be used on any type of animal fat and/or bone according to embodiments of the present disclosure. Further, while certain machines have been described as being used in particular steps of the improved processing of whole animals and animal products method, it should be appreciated that other machines may be used in place of or in addition to those described to perform similar functions without departing from the present disclosure.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A method for producing pet food, the method comprising:
   grinding and pre-breaking animal products and a whole animal in a grinder and a pre-breaker machine;
   transporting and heating the ground materials in a first heating step to create a slurry as the ground materials liquefy to form liquefied ground materials;
   using a screw press, draining protein from the liquefied ground materials;
   cooking the drained protein in a second heating step with hot water to eliminate impurities and fat in the protein;
   processing the drained protein through a centrifuge and spinning off a first solution of hot water, impurities, and oil to reduce humidity within the drained protein;
   washing the processed protein to remove additional impurities; and
   flame-drying the washed protein to burn off additional impurities and form safe pet food for consumption by pets.

2. The method of claim 1 further comprising:
   returning the first solution to the centrifuge; and
   removing residual solids from the oil and water to form a second solution.

3. The method of claim 1, wherein pressure of approximately 4-5 ATM is applied to the ground materials in the first heating step.

4. The method of claim 1 further comprising:
   supplying pressure to the slurry after the first heating step.

5. The method of claim 1 further comprising:
   pressing the slurry utilizing a progressive cavity pump without further mechanical action.

6. The method of claim 1, wherein the centrifuge ranges in size from approximately 10 microns to approximately 1 millimeter.

7. The method of claim 6 further comprising:
   returning the first solution to the centrifuge to remove water and fine materials from the oil.

8. The method of claim 7 further comprising:
   employing a vertical separator to further remove waste water and sludge from the oil.

9. The method of claim 8 further comprising:
   employing a waste water oil separator to further separate the oil from the waste water; and
   employing a sludge oil separator to further separate the oil from the sludge.

10. The method of claim 9, wherein the oil separated through use of the waste water oil separator and the sludge oil separator is returned to the centrifuge.

11. The method of claim 9, wherein the oil separated through use of the waste water oil separator and the sludge oil separator is transferred to a storage tank.

12. The method of claim 1 further comprising:
    applying pressure to the drained protein in a second pressing step, thereby further breaking down the drained protein and removing the residual liquid from the protein after it is pressed in the second pressing step.

13. The method of claim 12 further comprising:
    transferring the removed residual liquid to the centrifuge.

14. The method of claim 12 further comprising:
    transferring the protein after it is pressed in the second pressing step to a protein dryer to form a dried protein; and
    milling the dried protein to form a powder protein.

15. A method for improved processing of animal products and a whole animal that produces pet food, the method comprising:
- grinding and pre-breaking animal products and a whole animal in a grinder and a pre-breaker machine to form ground materials;
- transporting and heating the ground materials in a first heating step in one or more steam-jacketed tubes to create a slurry, as the ground materials liquefy to form liquefied ground materials;
- draining protein from the liquefied ground materials;
- processing the drained protein through a centrifuge and spinning off a first solution of hot water, impurities, and oil to reduce humidity within the drained protein;
- cooking the processed protein in a second heating step with hot water to eliminate additional impurities and fat in the protein;
- washing the cooked protein to remove additional impurities; and
- flame-drying the washed protein to burn off additional impurities and form safe pet food for consumption by pets.

\* \* \* \* \*